US006858147B2

(12) United States Patent
Dukhin et al.

(10) Patent No.: US 6,858,147 B2
(45) Date of Patent: Feb. 22, 2005

(54) METHOD FOR THE REMOVAL OF HEAVY METALS FROM AQUEOUS SOLUTION BY MEANS OF SILICA AS AN ADSORBENT IN COUNTER-FLOW SELECTIVE DIALYSIS

(75) Inventors: Andrei S. Dukhin, Goldens Bridge, NY (US); Stanislav Dukhin, Goldens Bridge, NY (US); Philip J. Goetz, Essex, NY (US)

(73) Assignee: Dispersion Technology, Inc., Bedford Hills, NY (US)

( * ) Notice: Subject to any disclaimer, the term of this patent is extended or adjusted under 35 U.S.C. 154(b) by 0 days.

(21) Appl. No.: 09/928,014

(22) Filed: Aug. 3, 2001

(65) Prior Publication Data

US 2004/0149658 A1 Aug. 5, 2004

(51) Int. Cl.[7] .............................................. B01D 11/00
(52) U.S. Cl. ....................... 210/644; 210/634; 210/681; 210/688; 210/651
(58) Field of Search ................................. 210/644, 634, 210/638, 681, 665, 688, 912, 651, 639

(56) References Cited

U.S. PATENT DOCUMENTS

| | | |
|---|---|---|
| 4,272,523 A | 6/1981 | Kotitschke et al. |
| 4,963,264 A | 10/1990 | Davis |
| 5,370,827 A | 12/1994 | Grant et al. |
| 5,871,648 A | 2/1999 | Allen et al. |
| 5,904,853 A | 5/1999 | Allen et al. |
| 6,077,439 A | 6/2000 | El-Ammouri et al. |

OTHER PUBLICATIONS www.GraceDavison.com
www.dispersion.com

*Primary Examiner*—Benjamin L. Utech
*Assistant Examiner*—K S Menon

(57) ABSTRACT

The process of heavy metals removal from the waste water using silica dispersion without mixing silica dispersion with the waste water. This is achieved due to the membrane device where silica dispersion and waste water stream are separated by membrane with pore sizes smaller that size of the silica particles. The process is organized as counter-flow, which means that silica dispersion and waste water flow in the opposite directions. This provides the maximum utilization of the adsorption capacity corresponding to the adsorbent being in equilibrium with the high initial concentration of the contaminant in distinction from the low utilization when adsorbent works in equilibrium with the low output concentration. In the particular instance the membrane device comprises a lumen of a bundle of hollow fibers with silica dispersion flowing either inside or outside of the fibers and wastewater flowing on the opposite side of the fiber membrane. This process eliminates step of separating silica from the wastewater. It opens way to use colloidal silica as adsorbent with highly developed surface area. Continuous monitoring of the silica particles zeta potential yields information for preventing colloidal silica solidification within the device. Solidification of the colloidal silica afterwards solves problem of untreated residual discharge.

6 Claims, 3 Drawing Sheets

Co-flow or batch mode

Counter-flow

METHOD FOR THE REMOVAL OF HEAVY METALS FROM AQUEOUS SOLUTION BY MEANS OF SILICA AS AN ADSORBENT IN COUNTER-FLOW SELECTIVE DIALYSIS

FIELD OF THE INVENTION

This invention relates to the use of a concentrated silica dispersion to remove heavy metals from aqueous solution by adsorption on the silica surface. The invention describes a means to perform this removal without mixing together the aqueous solution and the silica dispersion. The aqueous solution and the concentrated silica dispersion are separated by a dialysis membrane which prevents the silica particles from mixing with the aqueous solution but still allows the contaminating ions to diffuse through the dialysis membrane into the silica dispersion with subsequent adsorption on the silica surface. The optimization of this process requires the dialysis membrane to be built as a collection of the thin hollow fibers with either the aqueous solution or the silica dispersion flowing inside of the fibers and the other material flowing in the opposite direction outside these fibers.

This invention opens a way to use colloidal silica, with its highly developed surface and small particle size on the nanometer scale, as adsorbent. Importantly, colloidal silica has a tendency for spontaneous solidification, which leads to the permanent capture of the adsorbed cations and to a great extent solves the problem of disposal of the captured contaminants.

In particular, this invention describes a method for recovering heavy metal ions from industrial waste streams and ions of radioactive elements from radioactive wastewaters.

BACKGROUND OF THE INVENTION

Effective removal of heavy metals from wastewater of various origins remains a challenge for environmental protection technology. Current techniques for wastewater treatment involve large sedimentation pools, sand filters, large quantities of flocculants or other polymeric additives. A more efficient process that reduced equipment size and eliminated the use of flocculants would be a significant advancement in the art.

Several different methods have been previously suggested for achieving this goal.

Ion exchange using zeolite (M. J. Zamzow et al. Sep. Sci.Technology 25, 13–15 (1990) 1555–1569), quartz (T. W. Healy et al Adv. Chem.Ser 79 (1968)62) or alumina (M. Uberoi et al. Prep.Pap.Am.Chem.Soc.Div Fuel Chem 4 (1991)36) is unsuitable because these adsorbents work only for relatively high concentration of metal ions.

Direct electrochemical methods such as electrodialisis and other ion filtration techniques (Water Quality and Treatment, A Handbook of Community Water Supplies, Ed.:R. D. Letterman McGraw-Hill, 1999) are too expensive for large volumes of wastewater.

The most promising approach is to use silica as the heavy metals ion adsorbent. There are four US Patents issued (3 during the last 2 years) suggesting different silica based technologies for heavy metal removal: U.S. Pat. No. 5,370,827; 5,871,648; 5,904,853; and 6,077,439.

The ability of silica to adsorb heavy metals is well known and described in the following works: D. L. Dugger et al. J.Phys.Chem, 68 (1964) 757060; R. James and T. Healy, J.Coll. Interface Sci., 40 (1972) 65–81; K. Subramaniam et.al, Colloids and Surfaces 177 (2001) 133–146.

All four patents enumerated above suggest adding silica (or activated silica) directly to the wastewater. The silica particles, having adsorbed the offending metal ions, must then themselves be subsequently removed from the process stream Although in principle this can be achieved using filtration or sedimentation techniques, in practice the silica particles or aggregates used as the adsorbent must be large enough to facilitate their subsequent removal. In fact, the schemes suggested in all of these patents are suitable only for large silica particles, perhaps porous, having a surface area of less than 50–400 $m^2$ per gram. On the other hand colloidal silicas are routinely produced using wet precipitating technology which makes it possible to synthesize very small particle with size on the nanometer scale with surface areas of greater than 200 $m^2$ per gram. Ludox is a widely known colloidal silica manufactured initially by E. I. du Pont, now by Grace Davison. There are several grades with different sizes varying roughly from 10 to 30 nm. There are also many different colloidal silicas produced specifically for chemical-mechanical polishing of semiconductor wafers, which is considerably more expensive than Ludox silica. We know of only one instance where colloidal silica is suggested as an adsorbent: U.S. Pat. No. 4,272,523. This patent deals with a biological application, a method of making fibrinogen. It does not speak of the use of colloidal silica in relationship to metal ion extraction.

We suggest here a new removal scheme for taking advantage of the high affinity of the silica surface for heavy metals. The roots of this new scheme derive from U.S. Pat. No. 4,963,264 issued in 1990. This patent describes a so-called "selective dialysis with size selective membranes".

Selective dialysis is one variation of a wide class of membrane technologies. The solution to be treated is separated from the adsorbent dispersion by a membrane having a pore size somewhat smaller than size of the adsorbent particles. The membrane thus prevents the adsorbent particles from passing into the treated water stream, but importantly does allow molecules and ions to diffuse from the treated water into the adsorbent dispersion where they can then be trapped by adsorption on the surface of these adsorbent particles. U.S. Pat. No. 4,963,264 suggest that the separating membrane be organized as a collection of the hollow fibers. The treated water can be either on the inside or outside of the fiber. The adsorbent dispersion is placed on the opposite side relative to the treated water. This patent does mentions various polymer adsorbents for selective dialysis but does not mention silica This patent also does not specify the direction flow for the treated water and adsorbent dispersions, which might be very important to optimize the process efficiency, as we will show below.

There are two important and novel features in the current invention as compared with U.S. Pat. No. 4,963,264. First, we describe the use of silica as the affinity adsorbent within a general framework of selective dialysis. Second, we propose using this selective dialysis in a counter-flow mode. These two features allow us to achieve the following system improvements.

We completely eliminate the need for removing the silica particles from the treated water after adsorption.

We can reach much higher utilization of the adsorption capacity. In the traditional scheme the utilization of the adsorption capacity corresponds to the equilibrium with the output water stream (stream after treatment) with the low effluent concentration in it. In the suggested counter-flow scheme the utilization corresponds to the initial concentration in the waste water stream which exceeds the output concentration by orders of magnitude. Consequently, we can achieve much higher adsorption and capacity utilization.

The new scheme allows us to use colloidal silica with very small size and high surface area, which was impossible in the traditional scheme when silica is mixed directly to the treated water. It is important because colloidal silica has several advantages over polymer adsorbents mentioned in the U.S. Pat. No. 4,963,264. Colloidal silica:

- can be used at high volume fraction, up to 30%;
- is much cheaper than polymer adsorbents;
- is already produced in large quantities.
- is stable with respect to aggregation over a wide pH range.
- is negatively charged over a wide pH range.
- spontaneous solidifies in contact with air.

This last point is particularly important in view of the severely restricted discharge of untreated residuals under the National Pollutant Discharge Elimination System of the Clean water Act. Landfills continue to be the primary method of disposal of the solid waste and sludge. The buried refuse is subject to leaching by percolating water derived from rain and snowmelt. The liquid that is derived from these process is known as leachate. The ground water pollution by leachate became the serious ecological problem. This invention offers a unique solution to this problem. Adsorption of metal ions reduces the surface charge on the silica and it spontaneously become a solid glass. The heave metal ions are captured irreversible in this process. However, in order to eliminate this solidification within the device itself, we propose to continuously monitor the zeta potential of the colloidal silica using an electroacoustic zeta potential probe described in the U.S. Pat. No. 6109098.

BRIEF SUMMARY OF INVENTION

The process of heavy metals removal from wastewater using silica dispersion, colloidal silica in particular, in a membrane device where the silica dispersion and treated waste water stream are separated by a membrane with pore sizes smaller that size of the silica particles. In the particular instance the membrane device comprises a lumen of a bundle of hollow fibers with the silica or colloidal silica dispersion flowing either inside or outside of the fibers and wastewater flowing on the opposite side of the fiber membrane, ideally in the opposite direction to the silica dispersion flow (counter-flow mode). Continuous monitoring of the silica particles zeta potential yields information for preventing colloidal silica solidification within the device.

DETAILED DESCRIPTION OF INVENTION

This invention suggests a new process for treating waste water contaminated with heavy metals, singly or in combination. As used herein, the term "heavy metals" includes various heavy metals ions, alkali and alkaline earth metals, radioactive ions; such as ferric and aluminum ions, uranium, thorium, lead, mercury, copper, cesium, barium, and cadmium. It is also suitable for removal of radium, arsenic, boron, chromium, silver, selenium, beryllium, nickel, antimony, molybdenum, vanadium, zinc, thallium, strontium, cobalt, plutonium and the like As used herein, the term "waste water" includes all forms of solutions in which contaminates may be found, such as, for example, groundwater, drinking water, soil washing extractants, leachates, effluents, waste water streams from nuclear fuel handling/manufacturing facilities, and mining facilities.

It is well known that heavy metals dissolved in water have a high affinity to silica surfaces. The term "silica" as used herein, is associated with a variety of Si based oxides, which are described in details by R. K. Iler, "The Chemistry of Silica", Wiley, Chichester (1979) and A. P. Legrand, "The Surface Properties of Silicas", Wiley, NY, (1998).

The high affinity for heavy metals and its high surface area makes silica a very attractive candidate for an effective adsorbent. Its high surface area can be a result of either a high internal structure, as in the case of porous fumed silica, or to its very small particle size, as for colloidal silica.

Colloidal silica is a stable colloidal dispersion of silica nano-particles typically in some aqueous media. The size of the colloidal silica particles is much smaller than that for the silica which is generally used for adsorption. For instance, the size of silica Ludox particles varies with different grades from 10 to 30 nm. In addition, this material is thermodynamically stable, i.e. particles do not build aggregates under normal conditions. This stability makes it possible to produce colloidal silica at high volume fractions up to 30% vl. These two factors, small size and high volume fraction, yield a very large surface area exceeding 200 m$^2$ per ml of adsorbent slurry.

Figure 1:
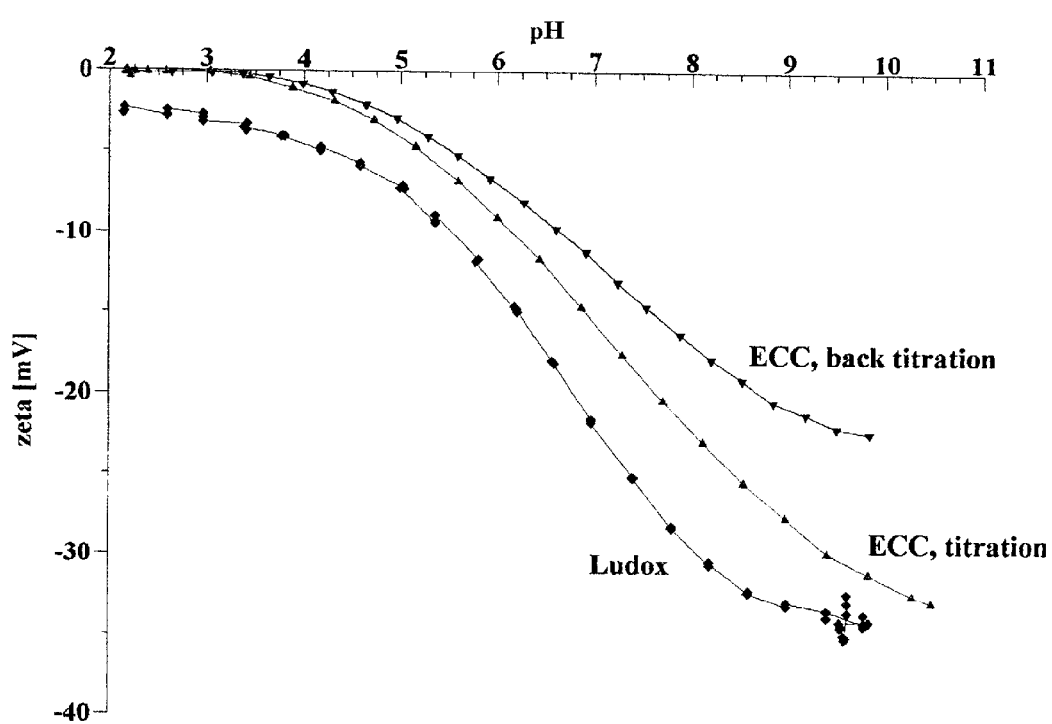
FIG. 1 pH titration of the silica Ludox TM-50 with 1 N HCl measured with electroacoustic Zeta potential probe DT-300.

The silica surface is typically negatively charged over a wide pH range. A typical pH titration of colloidal silica Ludox is shown on FIG. 1. These data were obtained using an electroacoustic zeta potential probe, namely a DT-300 built by Dispersion Technology Inc. The titration was performed with 1 N solution of HCl. It is seen that colloidal silica remains negatively charged for pH >2. This high negative charge over a wide pH range makes silica ideal for adsorbing positively charged ions, especially multivalent ions of heavy metals and radioactive elements.

As described previously, the prior art relies on a simple mixing of the silica adsorbent with the wastewater stream, with the necessity of removing the adsorbent particles when their work is complete. This might involve a large amount of expensive coagulant and flocculent to induce sedimentation or deposition at the deep filtration. In addition a large amount of sludge will be produced. But also important is the fact that such a simple scheme does not allow us to use the full adsorption capacity of the silica surface. At the final stage the silica surface exists in equilibrium with the clean water, which is then supposed to have a low concentration of heavy metals $C_{out}$. This means low adsorption $\Gamma_{batch}$ in the batch mode which is proportional to the bulk concentration according to the Henry law (Lyklema, J. "Fundamentals of Interface and Colloid Science", Volumes 1, Academic Press, 1993):

$$\Gamma_{batch} = K_H C_{out}$$

where $K_H$ is Henry's constant.

Traditional schemes do not permit using colloidal silica because it would be almost impossible to separate these small nanosize particles from the cleaned water.

We suggest overcoming this basic problem using the scheme of "selective dialysis", a membrane technology described in U.S. Pat. No. 4,963,264, which is currently medically for cleaning blood. A bundle of hollow membrane fibers are arranged such that one can pump two liquids through it, one inside and the other outside of the hollow fibers. The two liquids can exchange ions and molecules provided that their size does not exceed the pore size of the membrane.

According to this scheme we are able to pump colloidal silica solution and wastewater on opposite sides of the fibers membrane. For instance, in our experiment we filled the space between the fibers with silica Ludox dispersion and pumped our test water sample contaminated with copper ions through the interior of the fibers.

This counter-flow dialysis approach allows us to exploit the benefits of using colloidal silica yet eliminate the necessity to separate it from the water after the cleaning cycle.

Figure 2:
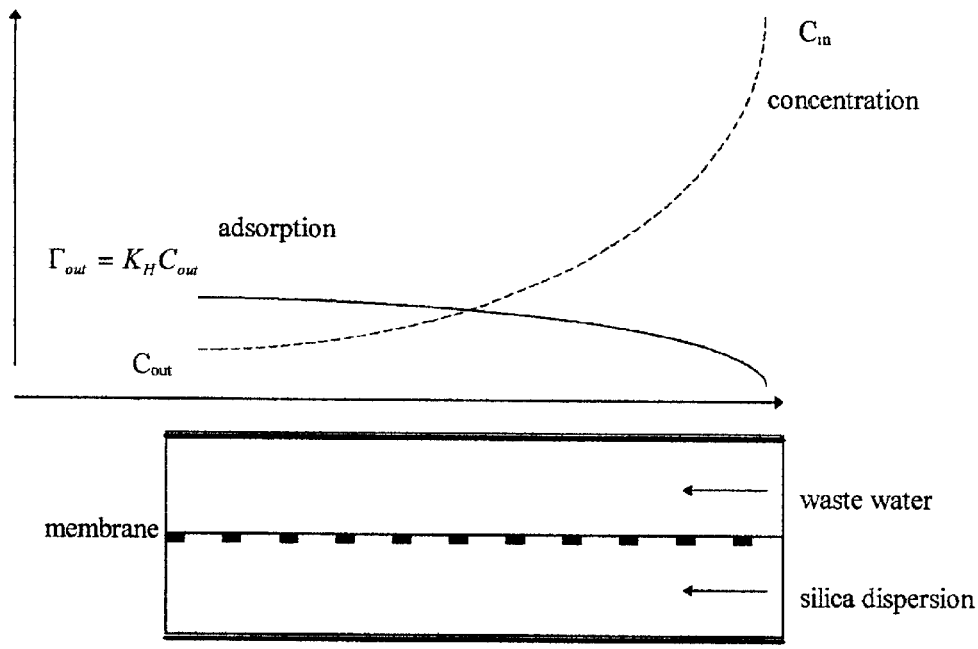
FIG. 2 Diagram illustration comparison of the co-flow and the counter-flow modes for adsorption efficiency.
Figure 2:
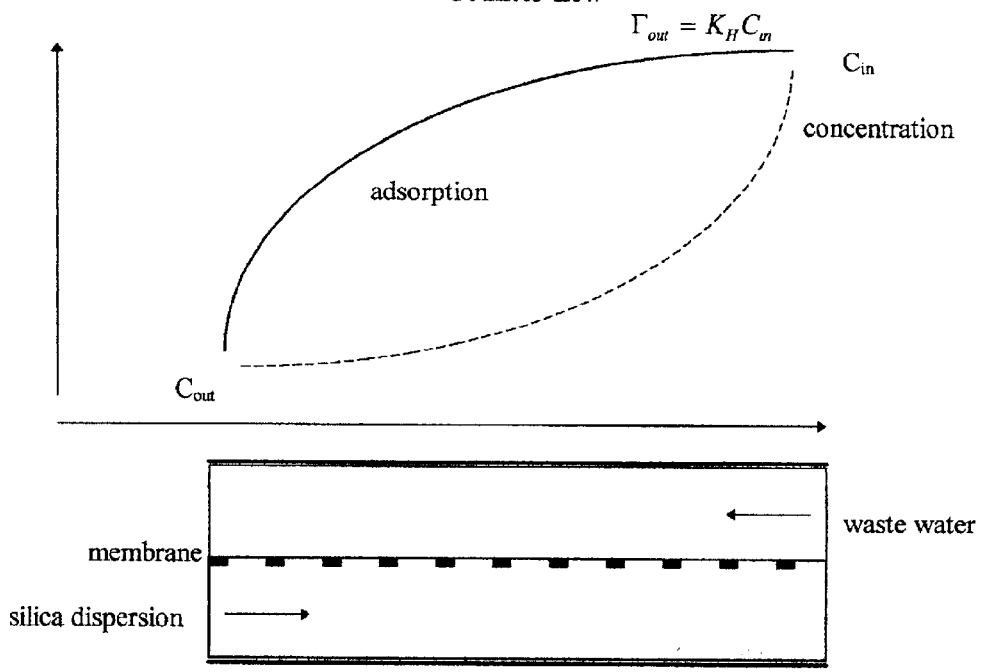

In addition, this approach solves the problem of low adsorption efficiency that is characteristic for the batch mode or co-flow mode. In the proposed counter-flow mode (see FIG. 2) the wastewater and silica solutions flow in opposite directions. As a result, the silica surface at the final stage of the adsorption is in equilibrium with the initial concentration of contaminates. Correspondingly, the adsorption of contaminates is higher:

$$\Gamma_{counter} = K_H C_{in}$$

This counter-flow modification of the selective dialysis method enables us to more fully utilize the high adsorption capacity of the silica than is possible in a batch mode or co-flow mode, where both fluids move in the same direction.

In order to prove that this approach works, we performed the following experiment.

Materials and Instruments

We used silica Ludox TM-50 produced by E. I. Dupont at 50% wt as an example of the colloidal silica.

We used the cupric cation $Cu^{+2}$ as an example of a multi-valent cation of the heavy or radioactive metals. A solution of these ions was prepared using Cupric Sulfate (molecular weight 249.68 g) supplied by Fisher Scientific Company.

Solutions of Cupric Sulfate were used for two purposes: calibrating our ions selective electrodes and as test wastewater samples.

We used a Cupric Ion Electrode manufactured by pHOENIX Electrode Company. A multipoint calibration was performed at $10_{-2}$, $10_{-3}$ $10_{-4}$ and $10_{-5}$ Mol/L.

We used Cupric Sulfate for preparing a model wastewater solution. We did this diluting 100 ml of the $2 \times 10^{-2}$ solution in 4 liters of the distilled water. The ion selective electrode gave a value of 36 milligram per liter, close to the expected value.

Removal of the cupric ion might be diminished by the presence of competitive multivalent ions such as calcium $Ca_{+2}$ having the same valency. In order to test this potential problem we prepared a solution which contained the same amount of the cupric ion as described above and 100 mg per liter of $Ca_{+2}$. We used Calcium Chloride Dihydate supplied by Fisher Scientific Company.

The selective dialysis devise that we used for this experiment was a Capillary Dialyzer model F80A manufactured by Fresenius USA. The free space between the membrane fibers was filled with Silica Ludox, and it was immobile during the experiment. The model wastewater solution was pumped through the fibers from bottom to the top.

Figure 3:
FIG. 3 Photograph of the capillary dialysis column filled with colloidal silica Ludox TM-50 after pumping 4 liters of the distilled water contaminated with 32 milligram per liter cupric ion. Blue zone on the bottom of the column indicates presence of cupric ions at high concentration.

FIG. 3 shows this dialysis devise which was used in this experimental setup.

Experimental Protocol and Results.

We made three runs.

In the first run we tested a waste sample that contained no calcium ions. This solution was pumped with low speed through the dialysis device. It took 2 hours to pump through 4 liters.

This experiment gives us a simple visual proof, as illustrated FIG. 3, that colloidal silica adsorbs cupric ion from the wastewater stream. The lower interior part of the dialyzer became bluish for a distance of 2 cm. The total height of the dialyzer is 18 cm The bluish color indicates that Cupric ions were indeed trapped at the bottom of the column.

The selectivity of this treatment was determined by measuring the cupric ion concentration of the wastewater stream following treatment. We measured 0.0004 milligram per liter, which means that the colloidal silica treatment reduced the cupric ion concentration by 5 orders of magnitude, i.e. by 100,000 times.

In order to estimate the adsorption capacity of the silica we measured the weight of that portion of the colloidal silica in the column that became blue. This portion amounted to just 10 grams, A so we can conclude that 10 grams was sufficient to remove practically all the copper (150 mg) from the 4 liters of water. This corresponds to an adsorption capacity of 14 mg copper/g silica, which is very close to the maximum adsorption capacity of silica.

In the second run we increased the speed of pumping by 10 times. The concentration of cupric ion in the treated water increased by only 3 times to 0.0012 milligram per liter.

The third run tested the influence of the calcium ion on the removal efficiency. We ran a solution that included both cupric and calcium ions and we used the high pumping speed. The concentration of the cupric ion in the final solution increased by slightly less than three times to 0.003 milligram per liter.

In the course of these experiment we made two observations that must be addressed in implementing this technology.

The first observation is related to pH variation. The value of the pH in the initial model wastewater solution was 5.2. It increased to 9.3 after treatment. This increase occurs because the colloidal silica itself is supplied at pH 9.3. Diffusion of the excess H ions across the membrane from the silica to the treated water causes the wastewater pH to increase. The pH value of the treated water can be reduced by reducing the pH of the initial silica solution. For instance, reducing it to pH of 7 would still retain substantial negative surface charge of the silica as it follows from the titration curve shown on FIG. 1.

We claim:

1. A process for the selective dialysis of the waste water containing heavy metals comprising the flowing steps of:
    providing a porous membrane, said membrane having pores of sufficient dimension to allow passage of the heavy metals ions through,
    circulating a concentrated dispersion of silica miscible with said waste water against a first side of said membrane, said silica particles having dimension larger than that of said pores;

passing said waste water containing said heavy metals ions against a second side said membrane whereby certain of said materials becomes bound to said silica particles upon passing through said membrane to said first side in a concentration greater than their concentration in said liquid stream and thereby become separated from the said liquid stream;

wherein said concentrated silica dispersion is fumed silica.

2. A process as set forth in claim 1, wherein said wastewater flow in the opposite direction to the said silica dispersion, in a counter-flow mode.

3. A process as set forth in claim 1, wherein said membrane is organized as membrane device comprising a lumen of a bundle of hollow fibers with silica dispersion flowing either inside or outside of the fibers and wastewater flowing on the opposite side of the fiber membrane.

4. A process as set forth in claim 1, 2, or 3, wherein said concentrated silica dispersion is colloidal silica.

5. A process as set forth in claim 1 or 3, wherein said colloidal silica saturated with adsorbed ions is pumped out and allowed to solidify.

6. A process as set forth in claim 5, wherein said colloidal silica saturated with adsorbed ions is pumped out and heat treated for solidification.

* * * * *